Patented Apr. 23, 1940

2,198,349

UNITED STATES PATENT OFFICE 2,198,349

ALKYL CRESOLS

Roland R. Read, Kirkwood, Mo., assignor to Sharp & Dohme, Incorporated, Philadelphia, Pa., a corporation of Maryland No Drawing. Original application October 10, 1932, Serial No. 637,199. Divided and this application April 17, 1937, Serial No. 137,478

15 Claims. (Cl. 260—624)

This invention relates to new alkyl cresols. It is a divison of my prior application Serial No. 637,199, filed October 10, 1932.

In my said prior application, I described an advantageous process for the production of alkyl phenols, which briefly consists in condensing alcohols with phenols in the presence of an acid solution of a condensing agent, e. g., a solution of zinc chloride in hydrochloric acid. I also described a number of important new alkyl phenols, including the alkyl cresols claimed in this application. By this process it is possible to condense secondary amyl alcohol, which may contain pentanol-2 and pentanol-3, normal amyl alcohol, secondary butyl alcohol, secondary hexyl alcohol which may contain both hexanol-2 and hexanol-3, secondary heptyl alcohol, cyclohexyl alcohol, tertiary amyl alcohol and tertiary butyl alcohol with cresols. Mixtures of the cresols may be employed in the preparation of alkyl cresols according to the process, or the individual isomers may be condensed with alcohols to give secondary hexyl ortho cresol, secondary meta cresol, secondary hexyl para cresol, secondary amyl meta cresol, and secondary butyl meta cresol, for example.

These new alkyl cresols include secondary amyl cresols, tertiary amyl cresols, secondary hexyl cresols, tertiary hexyl cresols and secondary butyl cresols, and mixtures of alkyl cresols resulting from the alklation of the mixtures of cresols which occur in commercial cresol. Of these last compositions, mixtures of hexyl and amyl cresols, corresponding to the mixture of cresols in commercial cresol, are of particular importance.

The production of these new compositions will be illustrated in the following examples, it being understood that the process described is by way of illustration only; although the process is one which has important advantages. I do not, however, claim the process in this application, as it is claimed in my said prior application.

*Example 1.*—3000 parts of cresol were heated with stirring to 130° when 2500 grams of zinc chloride were added slowly. A solution of 350 parts of concentrated hydrochloric acid in 2500 parts of secondary hexyl alcohol was added during three hours. Heating was continued two hours longer. The upper oil layer was collected, washed with water and distilled. The product coming over between 250 and 300° C. was taken as secondary hexyl cresol. This can be freed from the smaller amount of non-phenolic material by extraction with aqueous alkali.

*Example 2.*—570 parts of U. S. P. cresol and 1000 parts of zinc chloride are heated to 120° C. with stirring. A mixture of 165 parts of concentrated hydrochloric acid and 825 parts of n-butyl alcohol are added during two hours while the mixture is held at 110–135° C. During the next three hours a mixture of 600 parts of n-butyl alcohol and 85 parts of concentrated hydrochloric acid are added. The lower aqueous layer is separated and the oil washed with water. The oil is then distilled. The product distilling between 240 and 263° C. is collected as secondary butyl cresol. It is a new product.

*Example 3.*—500 parts of U. S. P. cresol and 500 parts of zinc chloride are heated with stirring to 120° C. 475 parts of secondary butyl alcohol containing 70 parts of concentrated hydrochloric acid is added during two hours while the temperature is maintained at 115–130° C. The lower aqueous layer is then separated; the oil washed with water and distilled, the product distilling between 235–265° C., being collected as secondary butyl cresol. It is a new product.

*Example 4.*—500 parts of meta cresol and 500 parts of zinc chloride are heated with stirring to 120° C. 475 parts of secondary butyl alcohol containing 70 parts of concentrated hydrochloric acid is added during two hours while the temperature is maintained at 115–130° C. The lower aqueous layer is then separated; the oil washed with water and distilled, the product distilling between 241 and 255° C., being collected as secondary butyl meta cresol. It is a new product.

*Example 5.*—365 parts of meta cresol are mixed with 340 parts of zinc chloride and heated to 130° C. 330 parts of mixed secondary amyl alcohols, containing 65 parts of concentrated hydrochloric acid, are added during two hours while the temperature is maintained at 120–130° C. The temperature is held at 130° C. for two hours longer; after which the lower aqueous layer is removed and the oil washed with water. The product is distilled and the fraction coming over between 245–260° C., collected as secondary amyl meta cresol. It is a new product.

*Example 6.*—365 parts of U. S. P. cresol are mixed with 340 parts of zinc chloride and heated to 130° C. 330 parts of mixed secondary amyl alcohols, containing 72 parts of concentrated hydrochloric acid, are added during two hours while the temperature is maintained at 120–130° C. The temperature is held at 130° C. for two hours longer, after which the lower aqueous layer is removed and the oil washed with water. The product is distilled and the fraction coming over between 245-270° C. collected as secondary amyl cresol. It is a new product.

Example 7.—3000 parts of U. S. P. cresol are mixed with 2800 parts of zinc chloride. 3500 parts of secondary hexyl alcohol, containing 500 parts of concentrated hydrochloric acid, are added during three hours while the temperature is maintained at 120-135° C. After one hour longer heating and stirring, the lower aqueous layer is removed and the oil washed with water. The product is then distilled and that portion coming over between 250 and 300° C., or on distillation at 8 mm. that portion coming over at 140-160° C. is collected as secondary hexyl cresol. It is a new product.

Example 8.—300 parts of meta cresol are mixed with 300 parts of zinc chloride and heated to 125° C. 310 parts of secondary hexyl alcohol containing 50 parts of concentrated hydrochloric acid are added during two hours. The temperature is maintained at 120-130° C. one hour longer while the mixture is stirred. The lower aqueous layer is then removed and the oil washed with water. The product is then distilled and that portion distilling between 260 and 290 or 300° C. is collected as secondary hexyl meta cresol. It is a new product.

Example 9.—300 parts of ortho cresol is mixed with 300 parts of zinc chloride and heated to 125° C. 310 parts of secondary hexyl alcohol containing 50 parts of concentrated hydrochloric acid are added during two hours. The temperature is maintained at 120-130° C. one hour longer while the mixture is stirred. The lower aqueous layer is then removed and the oil washed with water. The product is then distilled and that portion distilling between 250-270 or 275° C. is collected as secondary hexyl ortho cresol. It is a new product.

Example 10.—300 parts of para cresol are mixed with 300 parts of zinc chloride and heated to 125° C. 310 parts of secondary hexyl alcohol containing 50 parts of concentrated hydrochloric acid are added during two hours. The temperature is maintained at 120-130° C. one hour longer while the mixture is stirred. The lower aqueous layer is then removed and the oil washed with water. The product is then distilled and that portion distilling between 265 and 290 or 300° C. is collected as secondary hexyl para cresol. It is a new product.

Example 11.—500 parts of U. S. P. cresol are mixed with 325 parts of zinc chloride and heated to 120-130° C. 500 parts of tertiary amyl alcohol containing 100 parts of concentrated hydrochloric acid are added during two hours while the temperature is held at 100-130° C. or as near 100° as refluxing permits. The mixture is then heated one hour longer with stirring. The lower aqueous layer is then removed; the oil washed with water. The product is distilled and fraction coming over between 240 and 260 or 265° C. and collected as tertiary amyl cresol. It is a new product.

It is understood, of course, that the relative amounts of each ingredient used in the examples above may be varied over considerable limits, affecting only the yield.

The amyl and hexyl alcohols used were mixtures of the secondary alcohols available commercially. The use of any individual alcohol isomer would result in the production of the same mixture of cresols, differing only in the relative amounts of each phenolic isomer. U. S. P. cresol has been used as a typical commercially available mixture of the three cresols. Since this mixture may vary over wide limits in regard to the relative amounts of each isomer present, so the product obtained from such a mixture of cresols will contain varying amounts of the derivatives of the isomeric cresols somewhat in proportion to the amounts of each isomer present in the mixed cresols used.

The use of n-amyl or n-hexyl alcohol in place of the secondary alcohols would also lead to products differing but slightly, if at all, from those obtained from secondary alcohols.

Tertiary hexyl cresol, boiling at 250-260° C. may also be prepared by the condensation of tertiary hexyl alcohol or isohexyl alcohol with cresol in the presence of zinc chloride and an acid.

The new alkyl cresols are active germicides having a wide field of usefulness, and having phenol coefficients ranging up to nearly 200. They may be used to increase the activity of soap solutions containing phenol or cresol which already have antiseptic properties, for example, the addition of from 1% to 10% of an alkyl cresol such as a mixture of secondary hexyl cresols, for example, to a solution containing 35% of soap and 50% of a mixture of cresols and 5% of water and glycerin will give an antiseptic solution very much more active than the same solution without the addition of the alkyl phenol. Also a solution containing about 7% of soap, 6% of a mixture of cresols and 6% of a mixture of secondary hexyl cresols or other alkyl cresols, the balance being water is an antiseptic and may be used full strength or diluted with large amounts of water, as desired. In antiseptic soap solutions of this type, I prefer to use a linseed oil soap solution, although coconut oil or other fatty oils may be used as a basis for the soap instead of linseed oil, if desired. The amounts of cresol used may vary over wide limits. A mixture of the cresol isomers and the hexyl cresol isomers or a single cresol and hexyl cresol isomer may be employed. The resulting solutions upon dilution give more or less permanent emulsions depending upon the relative amounts of each ingredient present. Small amounts of other solvents may be added such as alcohol, acetone, ethylene glycol or an ethylene glycol ether, or diethylene glycol or a diethylene glycol ether.

Certain of the alkyl cresols may be taken internally and may be employed as urinary antiseptics. The effect of such antiseptics depends somewhat upon the diet of the animal under consideration. They may be administered as an oil solution inclosed in a gelatin capsule. A mixture of the secondary hexyl cresols exerts an anthelmintic action in addition to its antiseptic action and is to be recommended for treatment of the intestinal and urinary tracts. In general, the higher members of any series of alkyl phenols are less toxic and less escharotic than the lower. The secondary hexyl cresols and phenols, secondary amyl cresols and phenols and secondary butyl cresols and phenols are markedly antiseptic and relatively non-toxic. The secondary hexyl, amyl and butyl cresols have no appreciable escharotic action. They may be incorporated in oils such as olive oil or cottonseed oil for this purpose and if desired, such solutions may be administered in elastic gelatin capsules.

The alkyl cresols may be incorporated into jellies and ointments which also include a solvent for both phenol and water, for example, jellies prepared from such materials as tragacanth, acacia, etc. and containing glycerin alcohol, ethylene glycol or like solvents may be given antiseptic properties by the incorporation of small amounts of alkyl phenols. For example, a semifluid jelly prepared from tragacanth and acacia containing from 10 to 25% glycerin and from about 1 to 500 to 1 to 2000 parts, more or less, of secondary hexyl cresol has antiseptic properties.

The alkyl cresols may be incorporated in petrolatum base ointments, particularly if a second ingredient soluble in both oils and water such as dioxan, lanolin and the ethers of ethylene and diethylene glycol is added for the purpose of assisting the extraction of the phenol from the ointment base by surrounding aqueous fluids.

The alkyl cresols which are comparatively non-toxic are strongly antiseptic and may advantageously be used in small amounts for the preservation of cosmetics, powders, jellies and food products in general, particularly those not containing large amounts of nitrogenous materials.

I claim:

1. As new compounds, secondary alkyl cresols in which the secondary alkyl group has from four to six carbon atoms.
2. A mixture of isomeric alkyl cresols corresponding to the mixture of isomeric cresols in commercial cresol.
3. A mixture of isomeric hexyl cresols corresponding to the mixture of isomeric cresols in commercial cresol.
4. A mixture of isomeric secondary hexyl cresols corresponding to the mixture of isomeric cresols in commercial cresol.
5. A mixture of hexyl cresols.
6. A mixture of secondary hexyl cresols.
7. As new compounds secondary hexyl cresols.
8. A cresol derivative having the formula:

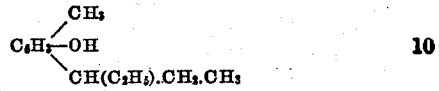

9. Secondary hexyl meta cresol.
10. A mixture of isomeric amyl cresols corresponding to the mixture of isomeric cresols in commercial cresol.
11. A mixture of isomeric secondary amyl cresols corresponding to the mixture of isomeric cresols in commercial cresol.
12. A mixture of isomeric tertiary amyl cresols corresponding to the mixture of isomeric cresols in commercial cresol.
13. As new compounds secondary amyl cresols.
14. A mixture of secondary amyl cresols.
15. Germicidal compositions containing in an effective germicidal concentration a mixture of alkyl phenols having an alkyl cresol with five to seven carbon atoms in said alkyl group.

ROLAND R. READ.